United States Patent
Kuntze et al.

(10) Patent No.: US 9,599,747 B2
(45) Date of Patent: Mar. 21, 2017

(54) DETECTION DEVICE FOR DETECTING AN OBJECT IN A DETECTION REGION ON AN INNER PANEL PART OF A MOTOR VEHICLE, MOTOR VEHICLE, AND CORRESPONDING METHOD

(71) Applicant: VALEO Schalter und Sensoren GmbH, Bietigheim-Bissingen (DE)

(72) Inventors: Daniel Kuntze, Stuttgart (DE); Lars Schoch, Remshalden (DE); Karl Simonis, Illingen (DE); Marcus Wildt, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/441,386

(22) PCT Filed: Nov. 7, 2013

(86) PCT No.: PCT/EP2013/073290
§ 371 (c)(1),
(2) Date: May 7, 2015

(87) PCT Pub. No.: WO2014/072421
PCT Pub. Date: May 15, 2014

(65) Prior Publication Data
US 2015/0309206 A1    Oct. 29, 2015

(30) Foreign Application Priority Data

Nov. 8, 2012 (DE) .................. 10 2012 021 972

(51) Int. Cl.
*B60R 22/00* (2006.01)
*E05F 15/00* (2015.01)
(Continued)

(52) U.S. Cl.
CPC ............... *G01V 8/20* (2013.01); *B60K 35/00* (2013.01); *B60K 37/00* (2013.01); *B60Q 9/00* (2013.01);
(Continued)

(58) Field of Classification Search
CPC .. G01V 8/20; B60R 21/01534; B60R 21/015; B60K 35/00; B60K 37/00;
(Continued)

(56) References Cited

U.S. PATENT DOCUMENTS 4,958,067 A * 9/1990 Nakatomi ............... G01V 8/20
                                                                  250/221
6,255,939 B1   7/2001 Roth et al.
(Continued)

FOREIGN PATENT DOCUMENTS

DE    10 2009 016 052 A1    10/2010
EP       1 114 756 A2         7/2001
(Continued)

OTHER PUBLICATIONS

International Search Report in corresponding PCT Application No. PCT/EP2013/073290 mailed Feb. 20, 2014 (6 pages).
(Continued)

*Primary Examiner* — Calvin Cheung
*Assistant Examiner* — Paula L Schneider
(74) *Attorney, Agent, or Firm* — Osha Liang LLP (57) ABSTRACT

A detection device for detecting an object is disclosed. The detection device is located on and/or above an inner panel part of a motor vehicle in the region of an exit opening implemented in the inner panel part, wherein the detection device has a detection region, in which the object is detectable in an acquisition direction of the detection device,
(Continued)

wherein the acquisition direction extends at least essentially in parallel to an opening plane of the exit opening.

17 Claims, 5 Drawing Sheets

(51) Int. Cl.

| | |
|---|---|
| *G05D 1/00* | (2006.01) |
| *G05D 3/00* | (2006.01) |
| *G06F 7/00* | (2006.01) |
| *G06F 17/00* | (2006.01) |
| *G01V 8/20* | (2006.01) |
| *B60K 35/00* | (2006.01) |
| *G01S 17/00* | (2006.01) |
| *G01S 17/02* | (2006.01) |
| *G01S 17/87* | (2006.01) |
| *G01S 17/88* | (2006.01) |
| *B60K 37/00* | (2006.01) |
| *B60R 21/015* | (2006.01) |
| *B60Q 9/00* | (2006.01) |

(52) U.S. Cl.
CPC ...... *B60R 21/015* (2013.01); *B60R 21/01534* (2014.10); *G01S 17/003* (2013.01); *G01S 17/026* (2013.01); *G01S 17/87* (2013.01); *G01S 17/88* (2013.01); *B60K 2350/106* (2013.01); *B60K 2350/941* (2013.01)

(58) Field of Classification Search
CPC ........ B60K 2350/106; B60K 2350/941; B60Q 9/00; G01S 17/008; G01S 17/026; G01S 17/87; G01S 17/88
USPC .......................................................... 701/45
See application file for complete search history.

(56) References Cited

U.S. PATENT DOCUMENTS

2006/0278817 A1* 12/2006 Pirkl ........................ G01V 8/20
250/221
2012/0040650 A1* 2/2012 Rosen ................ H04M 3/2218
455/414.1

FOREIGN PATENT DOCUMENTS

| | | |
|---|---|---|
| EP | 1 012 007 B1 | 2/2002 |
| GB | 2 236 419 A | 4/1991 |
| GB | 2 301 922 A | 12/1996 |
| JP | H10-100858 A | 4/1998 |
| JP | 10-157563 A | 6/1998 |
| JP | H11-43009 A | 2/1999 |
| JP | 2000-241547 A | 9/2000 |
| WO | 01/72557 A1 | 10/2001 |

OTHER PUBLICATIONS

Notification of Reason for Rejection issued in corresponding Japanese Application No. 2015-541134, mailed Jun. 3, 2016 (6 pages).

* cited by examiner

DETECTION DEVICE FOR DETECTING AN OBJECT IN A DETECTION REGION ON AN INNER PANEL PART OF A MOTOR VEHICLE, MOTOR VEHICLE, AND CORRESPONDING METHOD

The invention relates to a detection device for detecting an object in a detection region on and/or above an inner panel part of a motor vehicle in the region of an exit opening, in particular in the region of an opening for light beams of a heads-up display and/or an opening for an airbag. The device has a detection region, in which the object is detected in an acquisition direction. The invention additionally relates to a motor vehicle having such a detection device, specifically in particular a passenger automobile, and a corresponding method.

The interest is directed in the present case in particular to a detection device, which is implemented for detecting objects, which are located in the region of the dashboard of a motor vehicle, specifically in the region of an exit opening for light beams of a heads-up display or also for an airbag. Such objects can possibly represent a hazard for the vehicle occupants. They are hazardous, for example, if they are located in the region of an airbag. Therefore, the triggering of the airbag is to be prevented if an object is present on the dashboard. On the other hand, objects located on the dashboard can also be hazardous because they can deflect the laser beams of a heads-up display and align them on the vehicle occupants, for example. In the case of laser radiation, the hazard specifically exists of injuries to the eyes or skin due to reflection on objects, which are located in the region between the dashboard and the windshield.

A detection device for detecting objects in the region of an airbag is known, for example, from the document EP 1 012 007 B1. A distance sensor is used on the dashboard here, which measures the distance to the vehicle occupant. If an object is located between the vehicle occupants and the airbag, it can thus be detected on the basis of signals of the distance sensor and the airbag can be deactivated if necessary.

A system for monitoring the interior of a motor vehicle is known from the document GB 2 301 922 A. A variety of sensors including ultrasonic sensors and CCD sensors are used, which monitor the interior of the vehicle. The degree of fatigue of the driver can also be detected on the basis of sensor data.

The distance sensors proposed in the prior art for detecting objects have the disadvantage in particular that the detection region, in which the objects are to be detected, can only be imprecisely specified or defined. The detection region can be defined by a maximum distance, up to which an object is interpreted as an object and not as a vehicle occupant, as is proposed, for example, in the cited document EP 1 012 007 B1, however, specifying a concrete, specific detection region on the dashboard or instrument panel is not possible or is only possible imprecisely.

In addition, monitoring the entire exit opening is not possible in the prior art. Thus, in the document EP 1 012 007 B1, an object can only be detected if it is located inside the field of vision of the ultrasonic sensor. Objects which are located adjacent to the field of vision and cover the airbag cannot be detected.

It is the object of the invention to show a solution for how, in a detection device of the species mentioned at the outset, the detection region in which the objects are to be detected can be predefined particularly precisely and in a very targeted manner, and the entire region of the exit opening can be monitored.

This object is achieved according to the invention by a detection device, by a motor vehicle, and by a method having the features according to the respective independent patent claims. Advantageous embodiments of the invention are the subject matter of the dependent patent claims, the description, and the figures.

A detection device according to the invention is implemented for detecting an object, which is located on and/or above an inner panel part of a motor vehicle in the region of an exit opening implemented in the inner panel part, in particular an object which is laid on the panel part and preferably at least regionally overlaps the exit opening. The detection device has a detection region, in which the object is detectable in an acquisition direction of the detection device, wherein the acquisition direction extends at least essentially in parallel to an opening plane of the exit opening. The acquisition direction can extend in the opening plane or offset thereto and parallel thereto in this case.

An "acquisition direction" is understood in the present case as a detection direction, in which sensor signals of the detection device are emitted or a detection field is generated. The acquisition direction is therefore coincident with a sensor axis, which defines the main acquisition direction.

By way of such a detection device, objects can be reliably detected, which at least regionally overlap the exit opening and therefore represent a potential hazard. In addition, the detection region can therefore be very precisely specified and defined.

The detection region is preferably implemented such that it at least predominantly, in particular completely, overlaps the exit opening.

Furthermore, it can be provided that the exit opening is an opening for beams of a heads-up display and/or an opening for an airbag. The occupants can therefore be reliably protected.

In one embodiment, the device comprises at least one element pair made of a transmitting element and a receiving element. The transmitting element is implemented for emitting electromagnetic beams into the detection region. The receiving element is implemented for receiving at least a part of the beams and for providing an electrical sensor signal in dependence on the received beams. The detection device additionally comprises an electronic analysis unit, which can detect the object in the detection region in dependence on the sensor signal. The transmitting element is preferably implemented for emitting the beams along a predefined beam path, which defines the detection region, toward the receiving element, wherein the beams pass through the detection region along the predefined beam path and are incident on the receiving element only if no object is located in the beam path. Accordingly, the detection device is preferably implemented in the manner of a light barrier, by means of which the presence of an object in the detection region can be reliably detected. If the object is located in the beam path between the transmitting element and the receiving element, the beams thus do not reach the receiving element, which can be recognized by means of the electronic analysis unit on the basis of the sensor signal. In contrast, if no object is located in the beam path, the beams thus pass undisturbed through the predefined beam path up to the receiving element, which receives the beams. In this manner, the detection region, in which the objects are to be detected on the inner panel part of the motor vehicle, can be predefined particularly precisely and with high precision, specifically by appropriate arrangement of the transmitting element and the receiving element in relation to one another or by appropriate formation of the beam path.

The beam path therefore defines the acquisition direction of the detection device, so that the acquisition direction is predefined by the beam path.

The at least one transmitting element can be implemented for generating the beams in the spectral range which is visible or nonvisible by humans. The transmitting element preferably emits beams in the nonvisible spectral range. The frequency of the beams can be in the infrared spectral range, for example, so that the transmitting element is implemented for emitting infrared beams. The emitted beams can also be laser beams.

The at least one receiving element can be implemented in particular as a photodiode or also as a phototransistor.

However, the invention is not restricted to an optical device. The detection device can also be a capacitive and/or resistive and/or an antenna-based device, which therefore operates with high-frequency signals.

In one embodiment, the predefined beam path extends along a surface of the inner panel part, in particular also in parallel to the surface of the panel part. The beam path therefore extends between the transmitting element and the receiving element more or less above the panel part, so that objects can be reliably detected, which are located on the inner panel part. The detection region can therefore be defined without a large amount of effort by specifying the length of the beam path.

The detection device is preferably implemented for detecting the object on a dashboard as the inner panel part. It is therefore possible to acquire objects which are located in the region of an airbag or lie in the region of a heads-up display and therefore represent a potential hazard for the vehicle occupants. It can also be provided that the detection device is arranged in a depression of the dashboard.

The detection region is preferably a region between the dashboard on one side and a windshield of the motor vehicle on the other side. Objects located in this region in particular can represent a potential hazard if they reflect the laser beams of a heads-up display and deflect them in the direction toward the vehicle occupants. Such objects can now be detected with the aid of the detection device and a heads-up display can be temporarily deactivated, for example.

The electronic analysis unit can automatically cause greatly varying procedures in the motor vehicle after detecting the object in the detection region. For example, it can generate a control signal, as a result of which at least one component of the motor vehicle is deactivated, specifically in particular a projection display unit (heads-up display) and/or an airbag. Additionally or alternatively, the analysis unit can cause a warning signal to be output by means of a visual and/or acoustic output unit in the interior of the motor vehicle. On the one hand, the vehicle occupants are therefore reliably protected, on the other hand, the driver of the motor vehicle can be warned of the potential hazard.

In one embodiment, a mentioned transmitting element and a mentioned receiving element are arranged opposite to one another in direct line-of-sight connection, so that the predefined beam path extends linearly. In this embodiment, the predefined beam path is free of intended reflection points, and the beams propagate directly from the transmitting element toward the receiving element, without being reflected in between. The propagation preferably takes place via air. This element pair is therefore implemented in the manner of a forked light barrier and enables a reliable detection of the object between the transmitting element and the receiving element. This embodiment has proven to be advantageous in particular if the distance between the transmitting element, on one side, and the receiving element, on the other side, is relatively large and therefore the detection region itself is relatively broad.

Additionally or alternatively, an element pair made of a transmitting element and a receiving element, which do not have a direct line-of-sight connection (non-line-of-sight), can also be used. In this embodiment, the detection device can have a reflection element for deflecting the beams in the direction toward the receiving element. A larger surface region can be covered and monitored overall using one element pair by such a deflection of the beams. The element pair is implemented here in the manner of a reflection light barrier. The transmitting element and the receiving element can be arranged in this case on the shared side of the detection region, while the reflection element can be arranged on the opposite side of the detection region, by means of which the beams of the transmitting element are deflected in the direction toward the receiving element.

It can also be provided that the detection device is implemented in the manner of a light curtain and has a plurality of element pairs, each made of a transmitting element and a receiving element. A beam path from the transmitting element toward the receiving element can be specified in each case between the transmitting element and the receiving element of each element pair, so that the beams pass through the detection region along the respective predefined beam path and are incident on the respective receiving element only if no object is located in the respective beam path. In this manner, a very large surface region of the inner panel part can be monitored with regard to objects.

The beam paths of the plurality of element pairs preferably lie in a shared plane and/or in parallel to the surface of the inner panel part. The size of the detection region on the inner panel part can therefore be predefined with high precision and without great effort.

In one embodiment, the beam paths of the plurality of element pairs extend in parallel to one another. In this manner, a high and homogeneous resolution of the detection device in the detection region can be enabled, and even very small objects can therefore be reliably detected.

The transmitting elements of the plurality of element pairs preferably lie on a shared imaginary and straight line. Additionally or alternatively, the receiving elements of the plurality of element pairs can also lie on a shared straight line. The two straight lines can be coincident with one another or can be arranged at a distance from one another. If both the transmitting elements and also the receiving elements lie on a shared straight line, reflection elements are thus preferably used, which are used for deflecting the respective beams in the direction toward the respective receiving elements. If the receiving elements are arranged opposite to the transmitting elements, a direct line-of-sight connection thus results, and corresponding reflection elements can be omitted.

The detection device preferably comprises two components opposite to one another, which are embodied in particular as oblong and preferably also are linear. These two components can be arranged in parallel to one another, for example. The at least one transmitting element, in particular the plurality of transmitting elements, is integrated in a first of the components, while the at least one receiving element, in particular the plurality of receiving elements, is integrated in a second of the components or also in the first component. The receiving elements can thus be integrated in the same component as the transmitting elements or also in the other component. In the case of a light curtain in the manner of a forked light barrier, the transmitting elements are preferably integrated in the first component, while the receiving elements are integrated in the opposite second component. In the case of a light curtain in the manner of a reflection light barrier, in contrast, both the transmitting elements and also the receiving elements are integrated in the first component, while at least one reflection element, for example, in the form of a mirror, can be arranged on the second component. By providing the two components, the transmitting element and the receiving element and optionally also the reflection element can be attached or placed in a stable manner on the inner panel part.

In one embodiment, the detection device comprises at least one additional element pair made of an additional transmitting element and an additional receiving element. The additional transmitting element can be implemented to emit electromagnetic beams at an angle greater than 0° in relation to the above-mentioned predefined beam path, in particular in relation to a plane comprising the plurality of beam paths. The additional receiving element can receive the beams emitted by the additional transmitting element in this case if these beams are reflected on the object and deflected toward the receiving element. The additional transmitting element is preferably implemented to emit the beams at an angle greater than 0° in relation to the surface of the inner panel part. By way of such an additional element pair, objects can also be detected which are located above the inner panel part, wherein the height up to which the objects can be detected above the inner panel part can also be defined by appropriate setting of the mentioned angle. The additional transmitting element is preferably integrated in one component, while the additional receiving element is preferably integrated in the other component. In particular, a plurality of additional element pairs each comprising an additional transmitting element and an additional receiving element are also provided. The additional transmitting elements can be arranged distributed alternately with the "normal" transmitting elements, specifically, for example, along an imaginary straight line. The additional receiving elements can also be arranged distributed with the "normal" receiving elements on a shared straight line.

The invention also relates to a motor vehicle, in particular a passenger automobile, having a detection device according to the invention.

The invention also relates to a corresponding method for detecting an object in a detection region on and/or above an inner panel part of a motor vehicle.

The preferred embodiments presented with respect to the detection device according to the invention and the advantages thereof apply accordingly for the motor vehicle according to the invention and for the method according to the invention.

Further features of the invention result from the claims, the figures, and the description of the figures. All features and feature combinations mentioned above in the description and also the features and feature combinations, which are mentioned hereafter in the description of the figures and/or shown in the figures alone, are usable not only in the respective specified combination but rather also in other combinations or alone.

The invention will now be explained in greater detail on the basis of preferred exemplary embodiments and with reference to the appended drawings.

Figure 1:
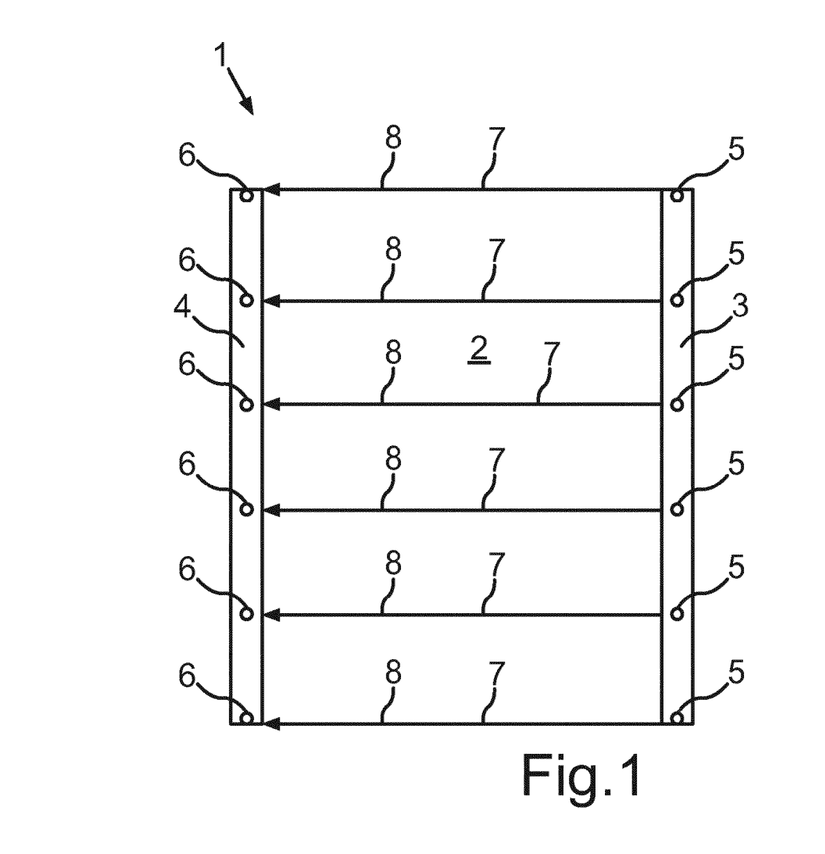
FIG. 1 shows a schematic illustration of a top view of a detection device according to a first embodiment of the invention.

An electronic detection device 1 illustrated in FIG. 1 is implemented for detecting an object in a detection region 2. The detection device 1 comprises two components 3, 4, which have the function of a housing or carrier for housing or carrying functional components of the detection device 1. The components 3, 4 are embodied as oblong and provided in the form of bars or pins in the exemplary embodiment. The linearly implemented components 3, 4 are arranged in parallel to one another and at a distance to one another, wherein the detection region 2 is implemented between the components 3, 4 and extends from the first component 3 on one side up to the second component 4 on the other side. The width of the detection region 2 therefore corresponds to the distance between the components 3, 4. The length of the detection region 2, in contrast, corresponds to the length of the components 3, 4. The detection region 2 is therefore a rectangular region in the exemplary embodiment.

The first component 3 contains a plurality of transmitting elements 5, which are schematically illustrated in FIG. 1, and which are implemented to generate electromagnetic beams in the visible or nonvisible spectral range. The transmitting elements 5 can be diodes, for example, in particular laser diodes. The transmitting elements 5 are arranged distributed equidistantly along the first component 3 on a shared straight line, so that the distances between each two adjacent transmitting elements 5 are equal.

In contrast, a corresponding plurality of receiving elements 6, which are implemented to receive the beams, is arranged on the second component 4. The receiving elements 6 can be photodiodes, for example. The receiving elements 6 are also arranged distributed equidistantly on a shared straight line, so that the distances between each two adjacent receiving elements 6 are of equal size. A separate receiving element 6 is assigned to each transmitting element 5 in this case, which is arranged opposite to the assigned transmitting element 5. Each transmitting element 5 emits light beams 7 in the direction perpendicular to the components 3, 4 and in the direction toward the assigned receiving element 6, wherein the beams 7 each pass through the detection region 2 along a predefined beam path 8. The beam path 8 represents an acquisition direction of the detection device in this case. The propagation medium between the components 3, 4 is air. The beam paths 8 are in this case linear routes or direct paths between the respective transmitting element 5 and the assigned receiving element 6. In the exemplary embodiment according to FIG. 1, the transmitting elements 5 on one side have a direct line-of-sight connection to the assigned receiving elements 6 on the other side, which is also referred to as a "line-of-sight". This means that no additional intended reflection points are present in the beam paths 8 and the beams 7 can possibly only be reflected on objects which are to be detected by the detection device 1. The bundled beams 7 therefore arrive at the respective receiving element 6 only under the condition that no object is located in the respective beam path 8. In contrast, if such an object lies in the detection region 2, at least one of the beam paths 8 is thus interrupted, and at least one of the receiving elements 6 does not receive any beams. This is detected with the aid of an electronic analysis unit (not shown), in particular a microprocessor, on the basis of sensor signals of the receiving elements 6.

The detection device 1 can particularly preferably be integrated in a dashboard of a passenger automobile. For example, it can be embedded in a depression of several millimeters in the dashboard. Objects can then be detected, which are arranged on the dashboard in the region between the dashboard and the windshield. The detection region 2 then preferably lies directly above an exit opening or directly in the plane of the exit opening and therefore at least predominantly overlaps the exit opening. The opening is preferably the opening through which light beams of a heads-up display are emitted. The components 3, 4 can optionally also be implemented as curved and therefore can be adapted to the geometric shape of the dashboard. However, they preferably extend in relation to one another such that a direct line-of-sight connection is always provided between the transmitting elements 5 and the respective associated receiving element 6.

The beam paths 8 preferably all lie in a shared plane, which extends in parallel to the opening plane of the exit opening and therefore in parallel to the surface of the inner panel part, on which the detection device 1 is arranged. The detection region 2 therefore lies directly on or above the inner panel part of the motor vehicle, so that all objects in the region of the inner panel part can be reliably detected.

If an object is detected by means of the mentioned analysis unit, greatly varying safety measures can be taken in the motor vehicle. On the one hand, for example, an airbag can be deactivated, in the region of which the object is located. On the other hand, additionally or alternatively, a heads-up display can also be deactivated, to prevent injury to the vehicle occupants by laser beams, which can be reflected on the object. Furthermore, additionally or alternatively, an acoustic and/or visual warning signal can also be output in the interior of the motor vehicle by means of an electronic output unit, so that the driver is warned accordingly of a potential hazard.

Such a detection device 1, as illustrated in FIG. 1, more or less represents a light curtain, which has a plurality of forked light barriers. The beam paths 8 extend in parallel to one another in this case. The resolution of the detection device 1 can therefore be set without great effort by selecting the corresponding number of element pairs, each made of a transmitting element 5 and a receiving element 6. For example, if very small objects are also to be reliably detected, the number of the element pairs can be increased accordingly. The number of the element pairs 5, 6 illustrated in FIG. 1 is only illustrated as an example in this case and can be selected differently depending on the exemplary embodiment.

Figure 2:
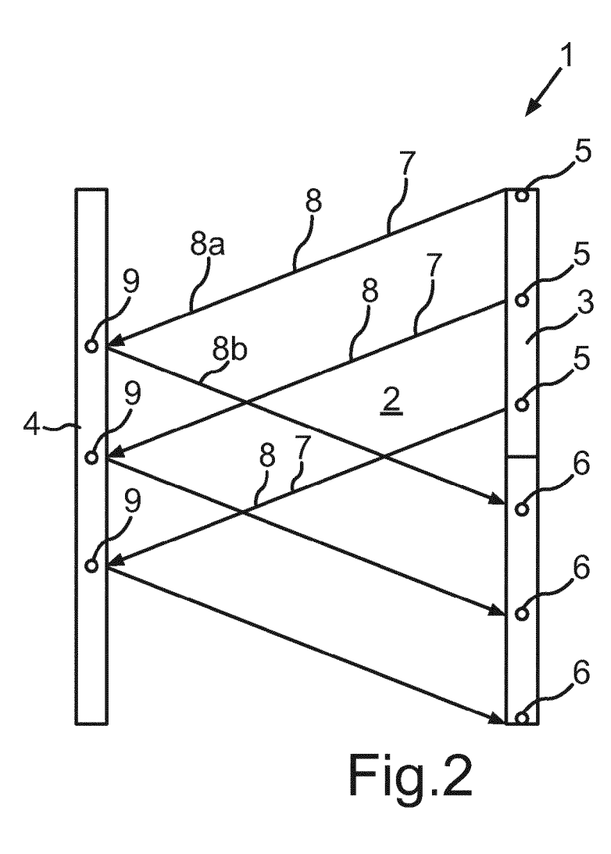
FIG. 2 shows a schematic illustration of a top view of a detection device according to a second embodiment of the invention.

A detection device 1 according to a second embodiment of the invention is illustrated in FIG. 2. This detection device 1 essentially corresponds to the device according to FIG. 1, wherein the following differences are provided: both the transmitting elements 5 and also the assigned receiving elements 6 are arranged on the first component 3. The component 3 is divided into two halves, and the transmitting elements 5 are arranged in the first half, while the receiving elements 6 are arranged in the second half. This means that all transmitting elements 5 are arranged distributed adjacent to one another and also the receiving elements 6 all lie adjacent to one another. However, they can also be arranged distributed in another manner. Reflection elements 9 are arranged on the second component 4, on which the respective beams 7 are reflected and deflected in the direction toward the respective assigned receiving element 6. A total reflection takes place, so that the respective beam paths 8 consist of two sections 8a, 8b, which are of equal length. The first section or the first partial beam path 8a extends between the transmitting element 5 and the assigned reflection element 9, while the second section 8b extends between the reflection element 9 and the assigned receiving element 6.

Such a detection device 1 also operates according to the principle of a light barrier, which is referred to, however, as a "reflection light barrier". The reflection takes place in this case at an angle of incidence, which can be in a value range from 5° to 25°, for example.

The reflection elements 9 can be implemented in the form of mirrors, for example. They can be separate elements. Alternatively, however, it can also be provided that the entire surface of the second component 4 facing toward the first component 3 is provided with such a mirror. Therefore, the precise positioning of individual reflection elements 9 is then also superfluous. The reflection element is then formed by the surface of the component 4.

Figure 3:
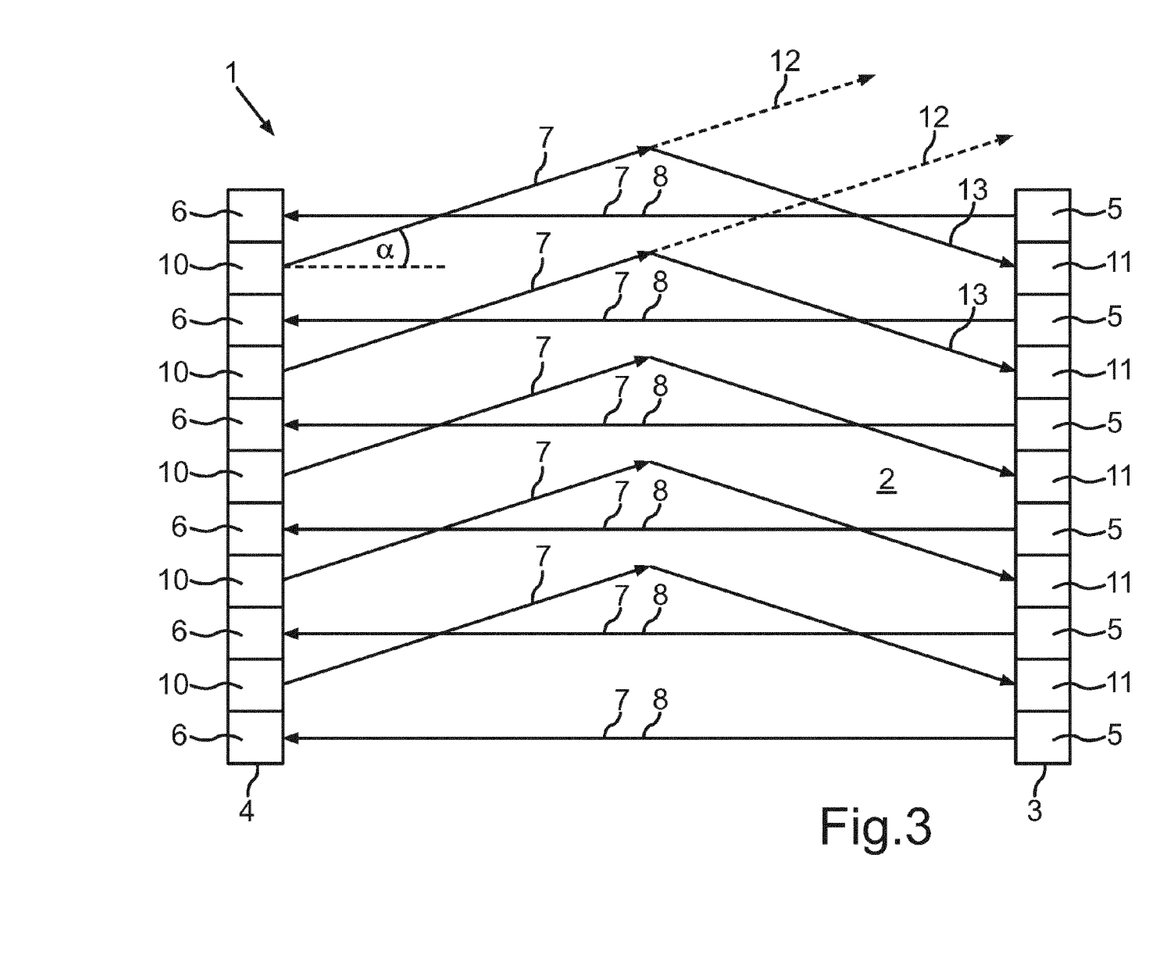
FIG. 3 shows a schematic illustration of a top view of a detection device according to a third embodiment of the invention.

A detection device 1 according to a third embodiment of the invention is shown in a schematic and abstract illustration in FIG. 3. While only objects which are located in the detection region 2 between the components 3, 4 can be detected using the detection devices 1 according to FIGS. 1 and 2, the detection device 1 according to FIG. 3 can additionally also detect objects which are located above the components 3, 4. For this purpose, the detection device 1 contains additional element pairs 10, 11, each made of an additional transmitting element 10 and an additional receiving element 11. The arrangement of the "normal" element pairs 5, 6 corresponds here to the embodiment according to FIG. 1, so that the device 1 is embodied in the manner of a forked light barrier. The additional transmitting elements 10 are arranged distributed on the second component 4 such that, for example, they lie alternately with the receiving elements 6. This means that one additional transmitting element 10 is arranged in each case between two adjacent receiving elements 6. The receiving elements 6 and the additional transmitting elements 10 can also lie on a shared straight line and also can be arranged distributed equidistantly overall.

The additional receiving elements 11 are arranged accordingly on the first component 3. An inverted arrangement is also possible, in which the additional transmitting elements 10 are arranged on the first component 3 and the additional receiving elements 11 are arranged on the second component 4. A mixed arrangement can also be provided, in which some of the additional transmitting elements 10 lie on the first component 3 and other additional transmitting elements 10 lie on the second component 4. It is only decisive that the additional transmitting element 10 and receiving element 11 of each element pair 10, 11 are arranged opposite to one another.

The additional transmitting elements 10 emit electromagnetic beams 7 at an angle $\alpha$ in relation to a plane, which extends through the two components 3, 4 or is defined by the beam paths 8. This also means that the beams 7 are emitted at an angle α in relation to the surface of the inner panel part, on which the detection device 1 is arranged. In FIG. 3, this reference plane corresponds to the plane of the drawing, so that the beams 7 are emitted more or less at an angle α in relation to the plane of the drawing.

If no object is located above the components 3, 4, the beams 7 emitted by the additional transmitting elements 10 propagate further, as indicated in FIG. 3 with 12—no beam is received by the additional receiving elements 11. In contrast, if an object lies above the components 3, 4, the beams 7 of the additional transmitting elements 10 are thus reflected on this object and deflected toward the respective receiving element 11, as indicated in FIG. 3 with 13. Inversely as in the case of the element pairs 5, 6, the beams 7 are only received by the additional receiving elements 11 if an object is located above the components 3, 4 or above the detection device 1 and above the inner panel part.

Objects can therefore also be detected which are located above the inner panel part and therefore at a slight distance to the inner panel part, for example, above the dashboard. The height, up to which the detection takes place, can be set by appropriate selection of the angle α, at which the beams 7 are emitted by the additional transmitting elements 10.

Figure 4:
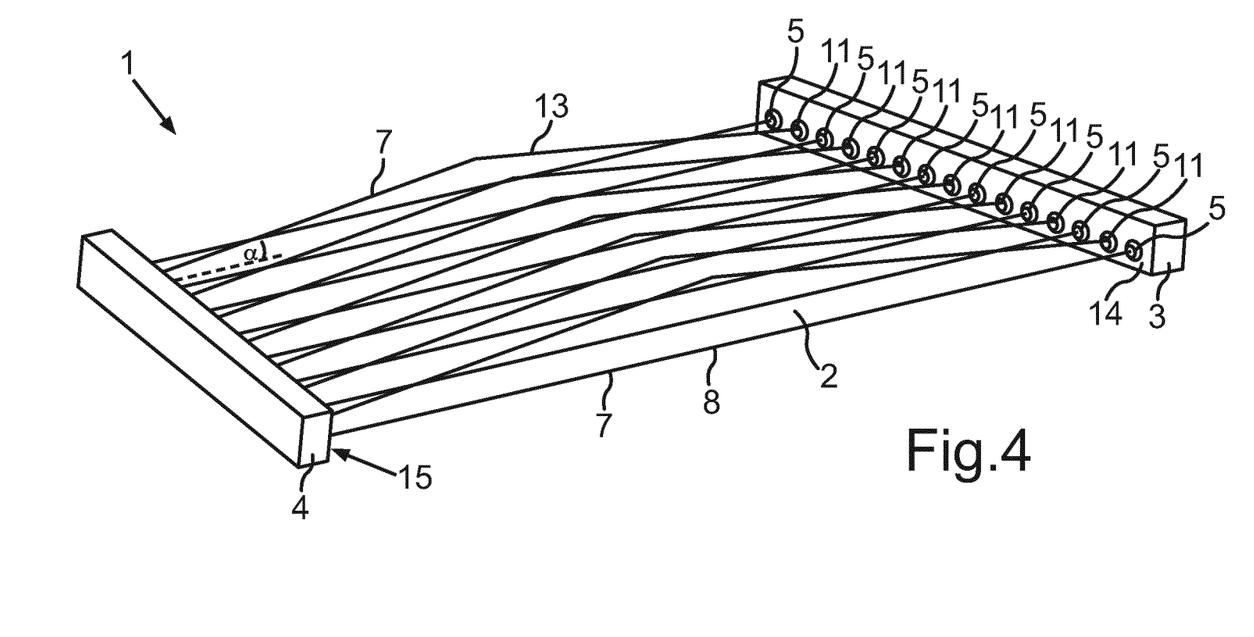
FIG. 4 shows a schematic and perspective illustration of the detection device according to FIG. 3.

FIG. 4 shows the detection device 1 according to the third embodiment in a perspective illustration. As may be seen from FIG. 4, the components 3, 4 can be implemented as cuboid and extend in parallel to one another. The respective transmitting and receiving elements 5, 6, 10, 11 can be arranged in this case on respective end sides 14, 15 of the components 3, 4, which face toward one another. The size of the detection region 2 can be precisely defined by appropriate selection of the length of the components 3, 4 and by selection of the distance between the components 3, 4.

Figure 5:
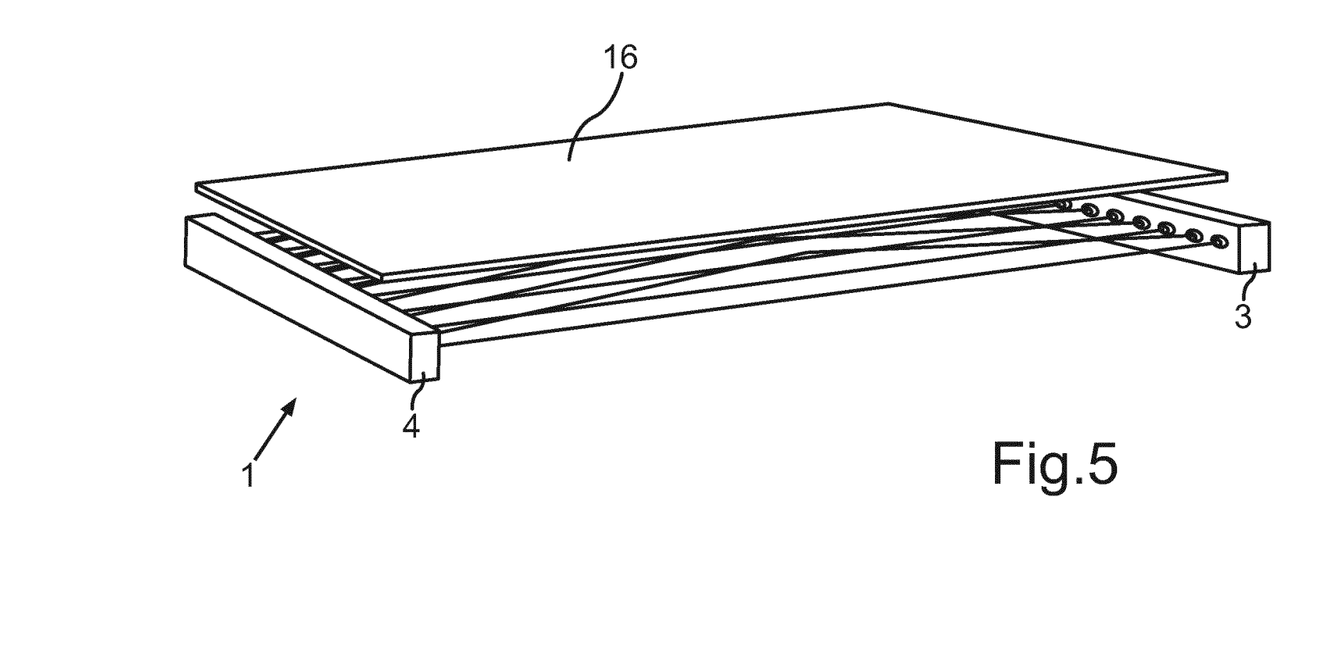
FIG. 5 shows a schematic and perspective illustration of the detection device according to FIG. 4, wherein an object is located above the detection device.

A situation is illustrated in FIG. 5, in which an object 16 is located above the detection device 1 and lies, for example, on the components 3, 4 or above these components 3, 4. Such a situation can result, for example, if the object 16 is longer than the distance between the components 3, 4. The detection of the object 16 is not performed here with the aid of the light barriers, but rather by means of the additional element pairs 10, 11.

Figure 6:
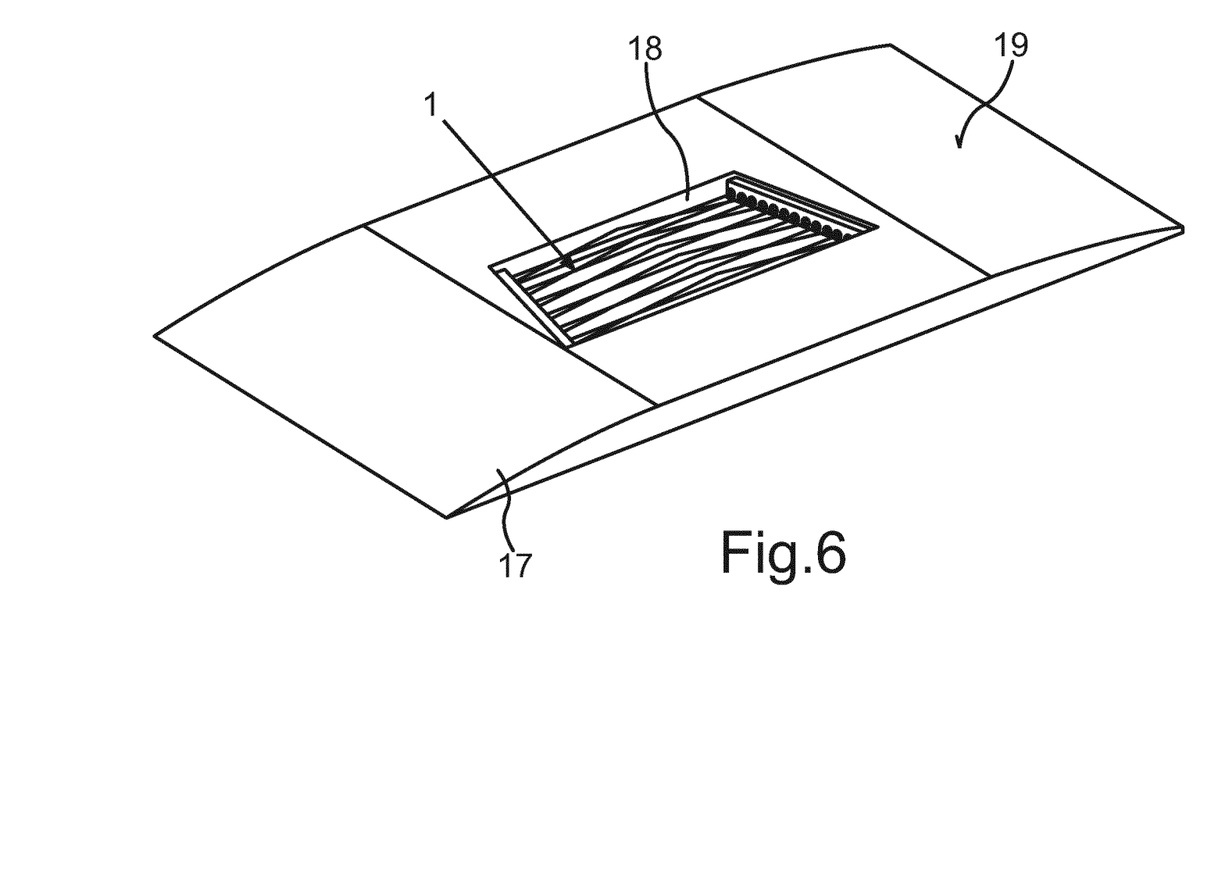
FIG. 6 shows a schematic illustration of the detection device according to FIG. 4, which is integrated in an inner panel part of a motor vehicle.

A region of an inner panel part 17 is illustrated in FIG. 6 in a schematic illustration, which is implemented, for example, as a dashboard or instrument panel. A recess or depression 18 is formed in the inner panel part 17, in which the detection device 1 according to one of the described embodiments is accommodated. This recess can optionally also represent the mentioned exit opening or the exit opening can be implemented in this recess, specifically in the base of the recess 18. The depth of the recess 18 can be a few millimeters in this case. The components 3, 4 are arranged in this case at opposite ends of the recess 18 and can also terminate flush with a surface 19 of the inner panel part 17 outside the depression. The detection region 2 therefore completely overlaps the exit opening.

If an object is now laid in the recess 18 of the inner panel part 17, this object is detected by means of the element pairs 5, 6. In contrast, if a larger object is laid on the surface 19 and therefore above the detection device 1, a detection takes place by means of the additional element pairs 10, 11.

The invention claimed is:

1. A detection device for detecting an object, which is located on or above an inner panel part of a motor vehicle in the region of an exit opening implemented in the inner panel part, the detection device comprising:
   a detection region, in which the object is detectable in an acquisition direction of the detection device, wherein the acquisition direction extends at least parallel to an opening plane of the exit opening,
   wherein the inner panel part is a dashboard of the motor vehicle,
   wherein the detection region is a region between a dashboard and a windshield of the motor vehicle.

2. The detection device according to claim 1, wherein the detection region at least predominantly, overlaps the exit opening.

3. The detection device according to claim 1, wherein the exit opening is an opening for beams of a heads-up display and/or an opening for an airbag.

4. The detection device according to claim 1, wherein the detection device farther comprises:
   a transmitting element for emitting electromagnetic beams into the detection region;
   a receiving element for receiving at least a part of the beams and for providing a sensor signal in dependence on the received beams; and
   an electronic analysis unit configured to detect the object in the detection region in dependence on the sensor signal.

5. The detection device according to claim 4, wherein the transmitting element is implemented for emitting the beams along a predefined beam path toward the receiving element, and the beams pass through the detection region along the predefined beam path and are incident on the receiving element only when no object is located in the predefined beam path.

6. The detection device according to claim 5, wherein the predefined beam path extends along, in parallel to, a surface of the inner panel part or in parallel to the opening plane of the exit opening.

7. The detection device according claim 4, wherein a transmitting element and a receiving element are arranged opposite to one another in a direct line-of-sight connection and the predefined beam path extends linearly.

8. The detection device according to claim 4, wherein the detection device has a reflection element for deflecting the beams in the direction toward the receiving element.

9. The detection device according to claim 1, further comprising an analysis unit which, after detection of the object in the detection region is configured to:
   generate a control signal for deactivating at least one component of the motor vehicle selected from a group consisting of: a projection display unit and/or an airbag, and
   output a warning signal by means of an output unit.

10. The detection device according to claim 1, further comprising
   a plurality of element pairs, each made of an optical transmitting element and an optical receiving element,
   wherein a beam path from the transmitting element toward the receiving element is specified in each case between the transmitting element and the receiving element of each element pair, so that the beams pass through the detection region along the respective predefined beam path and are incident on the respective receiving element only when no object is located in the respective beam path.

11. The detection device according to claim 10, wherein the beam paths of the plurality of element pairs lie in a shared plane or in parallel to the opening plane of the exit opening or in parallel to a surface of the inner panel part.

12. The detection device according to claim 10, wherein the beam paths of the plurality of element pairs extend in parallel to one another.

13. The detection device according to claim 10, further comprising an additional transmitting element for emitting electromagnetic beams at an angle greater than 0° in relation to a plane comprising the plurality of beam paths, and an additional receiving element, configured to receive the beams emitted by the additional transmitting element only when these beams are reflected on the object.

14. The detection device according to claim 1, further comprising
- two components located opposite to one another and embodied as oblong, and
- a plurality of transmitting elements integrated in a first of the two components, wherein a plurality of receiving elements is integrated in one of a second of the two components or in the first component.

15. A motor vehicle having an inner panel part comprising a vehicle dashboard, the vehicle further comprising:
- a detection device for detecting an object, which is located on or above an inner panel part of a motor vehicle hi the region of an exit opening implemented in the inner panel part, the detection device comprising;
- a detection region, in which the object is detectable in an acquisition direction of the detection device, wherein the acquisition direction extends at least parallel to an opening plane of the exit opening,
- wherein the inner panel part is a dashboard of the motor vehicle,
- wherein the detection region is a region between a dashboard and a windshield of the motor vehicle.

16. A method for detecting an object, which is located on or above an inner panel part of a motor vehicle in the region of an exit opening implemented hi the inner panel part, the method comprising:
- detecting the object by a detection device having a detection region in which the object is detected in an acquisition direction of the detection device,
- wherein the acquisition direction extends at least essentially in parallel to an opening plane of the exit opening,
- wherein the inner panel part is a dashboard of the motor vehicle,
- wherein the detection region is a region between a dashboard and a windshield of the motor vehicle.

17. The method according to claim 16, further comprising;
- emitting electromagnetic beams into the detection region by a transmitting element, at least a part of the beams being received by a receiving element;
- providing a sensor signal in dependence on the received beams; and
- detecting the object in the detection region in dependence on the sensor signal by an electronic analysis unit,
- wherein the transmitting element emits the beams along a predefined beam path, which defines the detection region, toward the receiving element, and the beams pass through the detection region along the predefined beam path and are incident on the receiving element only if no object is located in the detection region.

* * * * *

UNITED STATES PATENT AND TRADEMARK OFFICE
CERTIFICATE OF CORRECTION

| | |
|---|---|
| PATENT NO. | : 9,599,747 B2 |
| APPLICATION NO. | : 14/441386 |
| DATED | : March 21, 2017 |
| INVENTOR(S) | : Daniel Kuntze et al. |

Page 1 of 1

It is certified that error appears in the above-identified patent and that said Letters Patent is hereby corrected as shown below:

In the Claims

At Column 10, Claim number 4, Line number 14, the word "farther" should read -- further --.

At Column 11, Claim number 15, Line number 19, the word "hi" should read -- in --.

At Column 12, Claim number 16, Line number 3, the word "hi" should read -- in --.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*